United States Patent [19]

Goekler et al.

[11] Patent Number: 5,182,545
[45] Date of Patent: Jan. 26, 1993

[54] FLUID LEVEL SENSOR HAVING CAPACITIVE SENSOR

[75] Inventors: Lewis E. Goekler, Cincinnati; Edward R. Chamberlin, Loveland, both of Ohio

[73] Assignee: Standex International Corporation, Cincinnati, Ohio

[21] Appl. No.: 690,502

[22] Filed: Apr. 24, 1991

Related U.S. Application Data

[63] Continuation-in-part of Ser. No. 294,200, Jan. 6, 1989, Pat. No. 5,017,909.

[51] Int. Cl.⁵ .............................................. G08B 21/00
[52] U.S. Cl. .................................. 340/620; 73/304 C; 340/618; 324/690
[58] Field of Search ................. 340/620, 450, 618; 73/304 C; 324/690, 669

[56] References Cited

U.S. PATENT DOCUMENTS

| | | | |
|---|---|---|---|
| 2,868,015 | 1/1959 | Haropulos | 73/304 R |
| 2,919,579 | 1/1960 | Gronner | 73/304 C |
| 3,025,464 | 3/1962 | Bond | 324/689 |
| 3,230,770 | 1/1966 | Hermanson | 73/304 C |
| 3,321,971 | 5/1967 | Llewellyn et al. | 73/304 C |
| 3,341,774 | 9/1967 | Dyben | 324/663 |
| 3,494,193 | 2/1970 | Frantz | 73/304 C |
| 3,553,575 | 1/1971 | Shea | 324/674 |
| 3,694,804 | 9/1972 | Hill | 340/450 |
| 3,805,230 | 4/1974 | Sakasegawa et al. | 340/450 |
| 3,862,571 | 1/1975 | Vogel | 73/304 C |
| 3,935,739 | 2/1976 | Ells | 73/304 C |
| 4,001,676 | 1/1977 | Hile | 73/304 C |
| 4,003,259 | 1/1977 | Hope | 73/304 C |
| 4,010,650 | 3/1977 | Piatkowski, Jr. | 73/304 C |
| 4,099,167 | 7/1978 | Pomerantz et al. | 340/620 |
| 4,165,641 | 8/1979 | Pomerantz et al. | 73/290 R |
| 4,168,466 | 9/1979 | Boldt | 324/664 |
| 4,204,427 | 5/1980 | Gothe et al. | 73/304 C |
| 4,245,188 | 1/1981 | Rottmar | 324/690 |
| 4,266,144 | 5/1981 | Bristol | 307/116 |
| 4,277,773 | 7/1981 | Blatnik | 340/450 |
| 4,316,183 | 2/1982 | Palmer et al. | 340/621 |
| 4,347,740 | 9/1982 | Townsend | 73/304 C |
| 4,347,741 | 9/1982 | Geiger | 73/304 C |
| 4,389,889 | 6/1983 | Larson | 73/304 C |
| 4,589,281 | 5/1986 | Aldrich | 73/290 R |
| 4,603,581 | 8/1986 | Yamanoue et al. | 73/304 C |
| 4,638,291 | 1/1987 | Puscasu | 340/450 |
| 4,749,988 | 6/1988 | Berman et al. | 340/618 |
| 4,782,698 | 11/1988 | Wilson | 73/304 C |
| 4,788,488 | 11/1988 | Kramer et al. | 324/678 |
| 4,864,857 | 9/1989 | Koon | 73/304 C |
| 4,987,776 | 1/1991 | Koon | 73/304 C |

FOREIGN PATENT DOCUMENTS

| | | |
|---|---|---|
| 3504493A1 | 8/1986 | Fed. Rep. of Germany . |
| 441576 | 1/1936 | United Kingdom ............ 73/304 C |
| 696907 | 9/1953 | United Kingdom ............ 340/618 |

Primary Examiner—Jin F. Ng
Assistant Examiner—Christine K. Oda
Attorney, Agent, or Firm—Weingarten, Schurgin, Gagnebin & Hayes

[57] ABSTRACT

A capacitive liquid level sensor utilizes capacitive principles to sense the level of a liquid contained within a receptacle. As a liquid rises and falls in the container, the dielectric effect of the liquid changes the effective capacitance of a sensing capacitor which is detected by electronic circuitry coupled to the sensor. One plate of the sensor capacitor is a probe disposed within a receptacle while a grounded conductive portion of the receptacle is a second plate of the capacitor. The liquid within the receptacle acts as a dielectric between the plates.

5 Claims, 6 Drawing Sheets

FLUID LEVEL SENSOR HAVING CAPACITIVE SENSOR

RELATED APPLICATIONS

This application is a continuation-in-part of U.S. Pat. application Ser. No. 07/294,200, filed Jan. 6, 1989, U.S. pat. No. 5,017,909.

FIELD OF THE INVENTION

The present invention relates to fluid level detectors and more particularly, to a capacitive fluid level detection system for detecting the level of a liquid contained within a receptacle.

BACKGROUND OF THE INVENTION

Fluid level detectors which sense the level of a liquid contained within a receptacle are well known for use in conjunction with automotive engines. Historically, such detectors have been made in the form of float operated switches involving moving parts which are subject to friction and wear. Other devices utilize an electrical probe to detect fluid levels by measuring the conductivity of the fluid. However, these devices require complicated current amplifying systems because there is often an insufficient amount of current passing through the electrodes to power an indicator lamp.

Several systems have been developed using both intrusive and non-intrusive capacitive means to sense fluid levels contained in receptacles. The non-intrusive systems typically involve wave propagation techniques which are implemented through a transmitter/receiver system. Typically, these systems involve the transmission of an ultrasonic signal from a transmitting transducer through a fluid to a receiving transducer. Such ultrasonic transmission systems require a liquid transmission medium in order to carry the ultrasonic signal from the transmitting transducer to the receiving transducer. Lack of signal at the receiving transducer relates to a lack of liquid transmission medium, activating a no fluid present indication. However, a failure in the transducer pair or in their respective electronic connections results in a lack of signal from the receiving transducer which, in turn, activates the normal failure mode, thereby falsely indicating a dry or no fluid present state.

The increasing importance of monitoring fluid levels in automotive and other applications creates a need for more reliable intrusive and non-intrusive fluid level sensors.

SUMMARY OF THE INVENTION

The present invention utilizes capacitive principles to sense the level of a liquid contained within a receptacle. As a liquid rises and falls in the container, the dielectric effect of the liquid changes the effective capacitance of the sensing capacitor which is detected by electronic circuitry coupled to the sensor.

In an illustrative embodiment, one plate of the sensor capacitor is a probe disposed within a receptacle while a grounded conductive portion of the receptacle is a second plate of the capacitor. The liquid within the receptacle acts as a dielectric between the plates.

DESCRIPTION OF THE DRAWINGS

The invention will be more fully understood from the following detailed description taken in conjunction with the accompanying drawings, in which.

DETAILED DESCRIPTION OF THE INVENTION

Figures 1A, 1B:
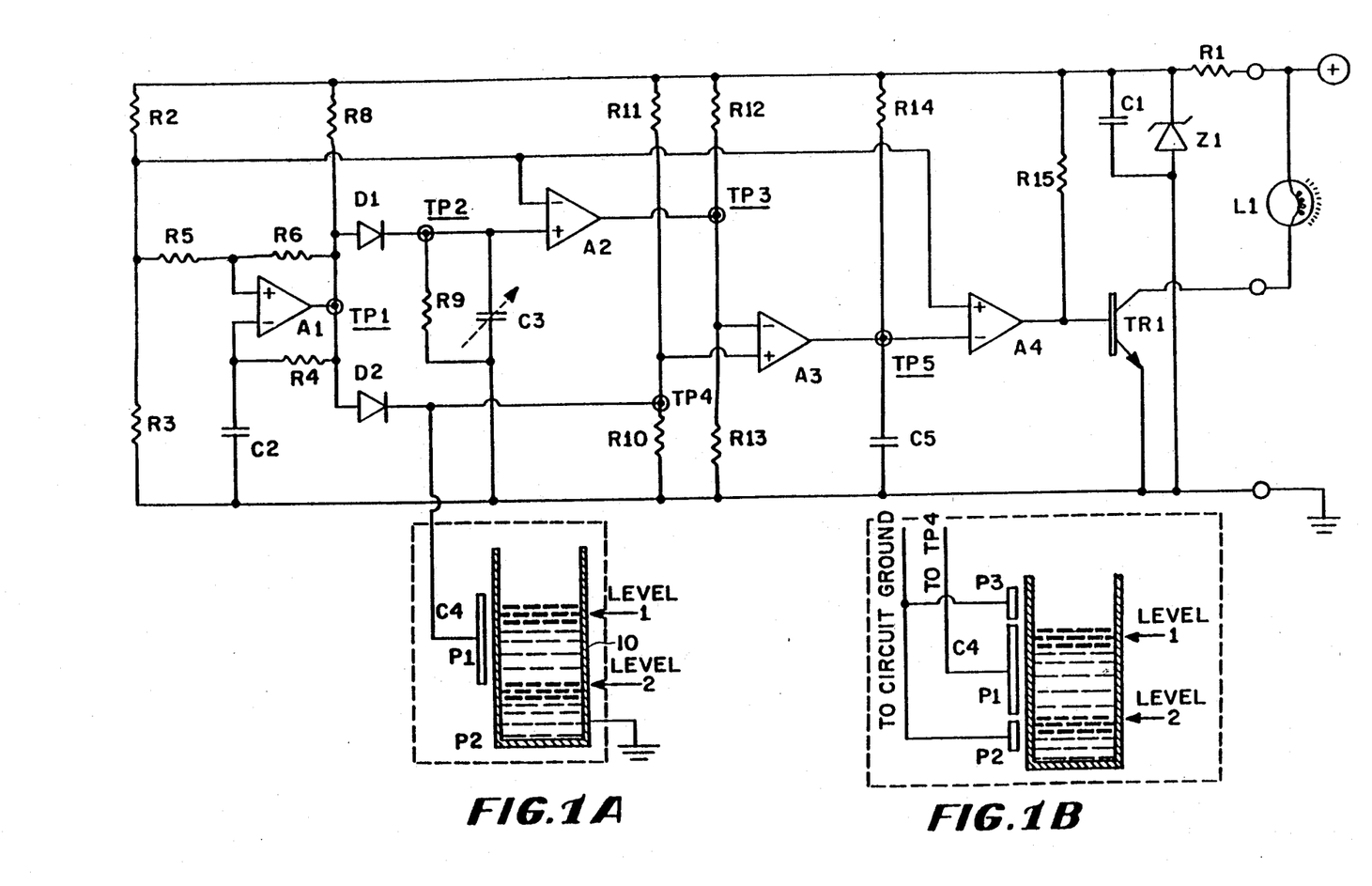
FIG. 1A is a schematic of the circuitry of an embodiment of the invention.
FIG. 1B is a schematic of an alternative capacitive sensing circuit.

FIG. 1A illustrates the circuit diagram of one embodiment of the fluid level detector of the present invention. The supply voltage for this circuit is typically provided by a 12-volt automobile battery which is reduced to a 5-volt DC source voltage by means of a voltage regulator comprising the combination of resistor R1 and zener diode Z1. Capacitor C1 serves as a filter for this voltage supply regulator.

The detector of FIG. 1A incorporates an amplifier A1 in conjunction with a resistor/capacitor network R4 and C2 and resistors R5 and R6 to form a square wave oscillator. A reference voltage is supplied from the voltage regulator where the reference voltage value is determined by the voltage divider circuit R2/R3. This voltage serves as a reference voltage for the square wave oscillator and voltage comparators A2, A4 located in the circuit, as will be described.

Figure 2A:
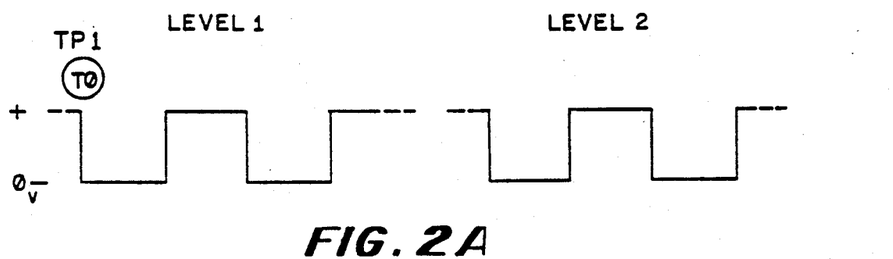
FIGS. 2A–2E are signal diagrams of signals at certain test points in the schematic diagram of FIG. 1.

The output of the square-wave oscillator described above is shown as the square wave of FIG. 2A. The oscillator produces an alternating electrical output which causes capacitors C3 and C4 to charge through diodes D1 and D2, respectively, where capacitor C4 is a sensor capacitor and capacitor C3 is a reference capacitor. As stated, capacitor C4 is the sensor capacitor wherein the two conductive surfaces of the capacitor are plate P1 and the residual ground of the receptacle 10 through its mounting arrangement. The dielectric of the capacitor is the fluid in the receptacle 10 such that the capacitance value of C4 varies relative to the fluid level in the receptacle. The capacitance value of capacitor C3 is adjustable to match the value of capacitor C4 when a predetermined liquid level is sensed, i.e., at the critical level.

FIG. 1B shows an alternative embodiment of the present invention wherein plates P2 and P3 are added to the configuration of sensing capacitor C4. The plates P2 and P3 are connected to circuit ground. A lower level capacitance is provided by plates P1 and P2, and an upper level capacitance is provided by plates P1 and P3.

When the voltage from the oscillator circuit at test point 1 (TP1) makes a transition from positive to negative, capacitors C3 and C4 begin to discharge through resistors R9 and R10, respectively. It is the difference in voltage decay across resistors R9 and R10 due to the capacitance values of capacitors C3 and C4 which enables the circuit to determine if there is sufficient fluid in the receptacle 10.

Figure 2B:
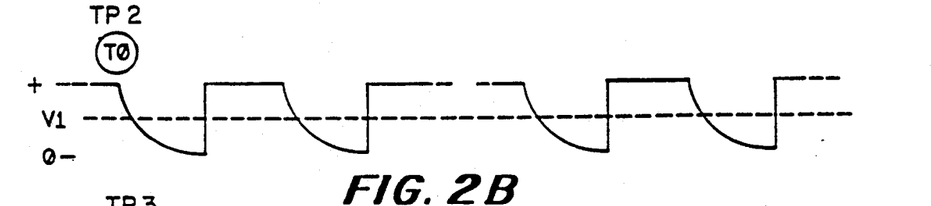
Figure 2C:
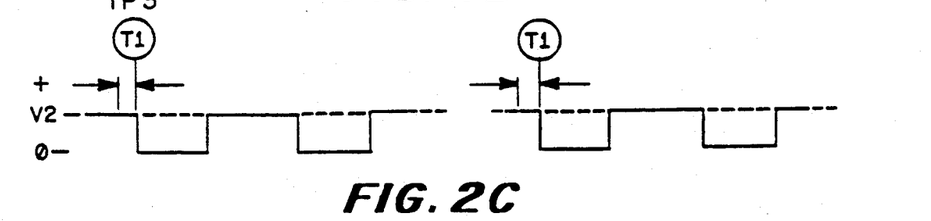

Referring again to FIG. 1A, voltage comparator A2 compares the voltage at test point 2 (TP2) with the reference voltage set by resistors R2 and R3. FIGS. 2B and 2C illustrate that when the voltage at TP2 decreases below the reference voltage V1, due to the discharge of capacitor C3, the output of the comparator A2 reference voltage at TP3 drops to zero. The time between the point where capacitor C3 begins to discharge and the output of the comparator A2 drops to zero is used as a reference time T1. Similarly, the comparator A3 compares the square wave output of the comparator A2 with the voltage decay signal across resistor R10 due to sensor capacitor C4 at test point TP4.

Figure 2D:
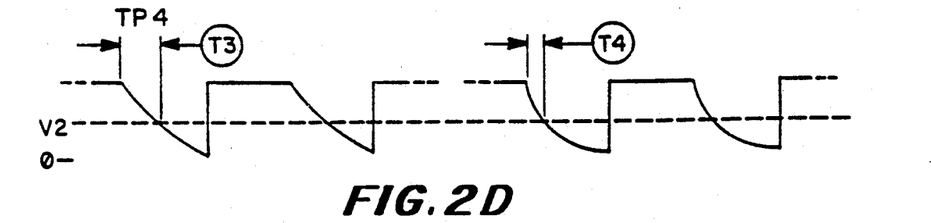
Figure 2E:
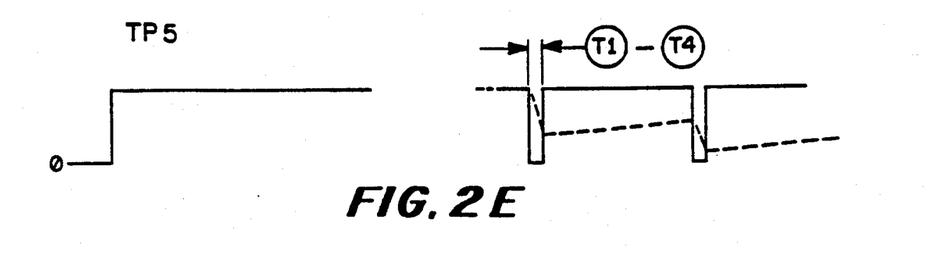

As shown in FIGS. 2C–2E, if the discharge time T3 of capacitor C4 is longer than the reference time T1 established by the comparator A2, the output of the comparator A3 remains high. Conversely, if discharge time T3 is shorter than reference time T1, due to a faster discharge rate in C4, the output of the comparator A3 pulses low for a period of time in which the discharge voltage at TP4 is less than the output voltage of the comparator A2 (TP3). In application, this pulse is actually a current pulse rather than a voltage pulse.

The output of the comparator A3 is an open collector type output which allows capacitor C5 to charge through resistor R14. If the output of A3 pulses low, capacitor C5 discharges to ground and the voltage at test point 5 (TP5) goes to zero.

Finally, the reference voltage set by resistors R2 and R3 is compared to the voltage at TP5 through the comparator A4. If the voltage at TP5 is high. representing capacitance C4 to be of a relatively large value and corresponding to a sufficient fluid in the reservoir, the output of A4 will pull to ground and transistor TR1 will not conduct. However, if the voltage at TP5 is low, which means that capacitance C4 is not of a sufficient value, the output of A4 will bias transistor TR1 such that current will flow through the collector and energize lamp L1.

In operation, when the fluid level in the receptacle is full, capacitor C4 takes a certain length of time to discharge; when the fluid is at a lower level, capacitor C4 takes a shorter period to discharge. Thus, as the fluid level in the receptacle decreases, the capacitance of capacitor C4 also decreases, which, in turn, decreases the discharge time of capacitor C4. This causes a current pulse to be output by comparator A3 during the period in which the discharge voltage from capacitor C4 is less than the voltage output from comparator A2. The current pulse causes capacitor C5 to discharge, thereby allowing the output of comparator A4 to rise and allowing current to flow through transistor TR1 to light lamp L1.

Figure 3A:
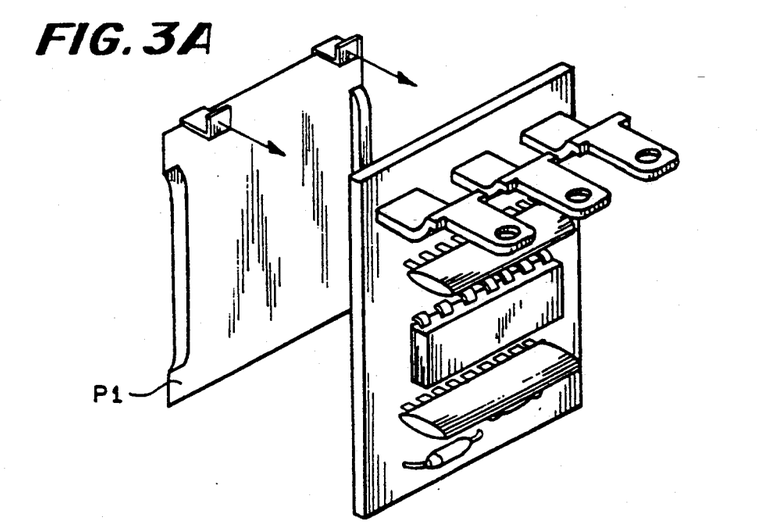
FIGS. 3A and 3B are exploded perspective views of a preferred embodiment of the liquid level sensor of the present invention.
Figure 3B:
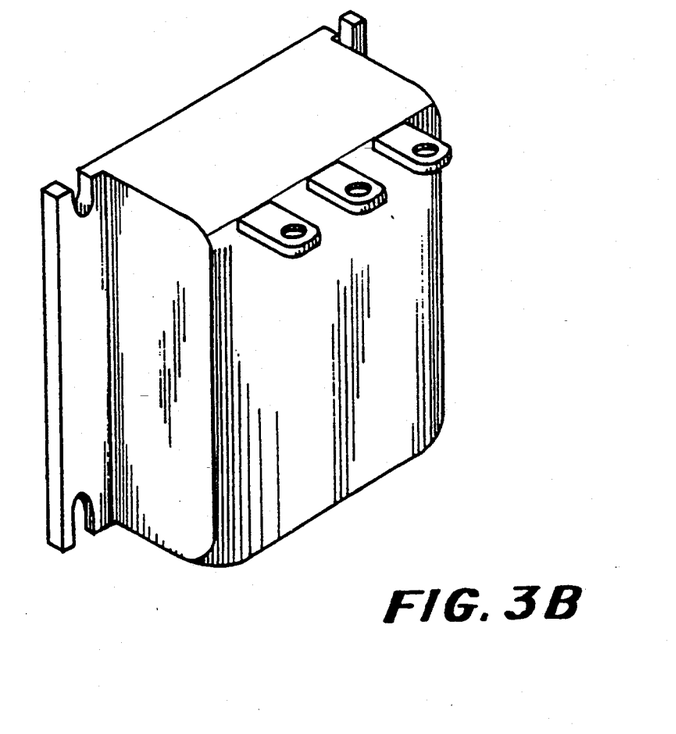

An exploded perspective view of the present invention is shown in FIGS. 3A and 3B where sensor plate P1 is shown as an integral part of the assembled unit. In an alternative embodiment, capacitor plate Pl can be physically separated from the electronic circuitry of the invention such that the sensor plate P1 is attached to the fluid receptacle and is electronically coupled to the corresponding electronic circuitry located at a position which is isolated from the receptacle.

Figure 4A:
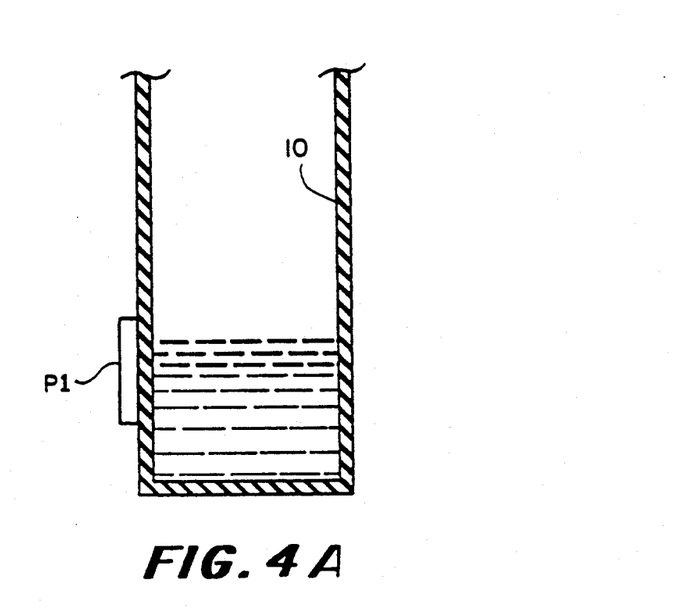
FIGS. 4A and 4B are two-dimensional views of alternative mounting configurations of the present invention.
Figure 4B:
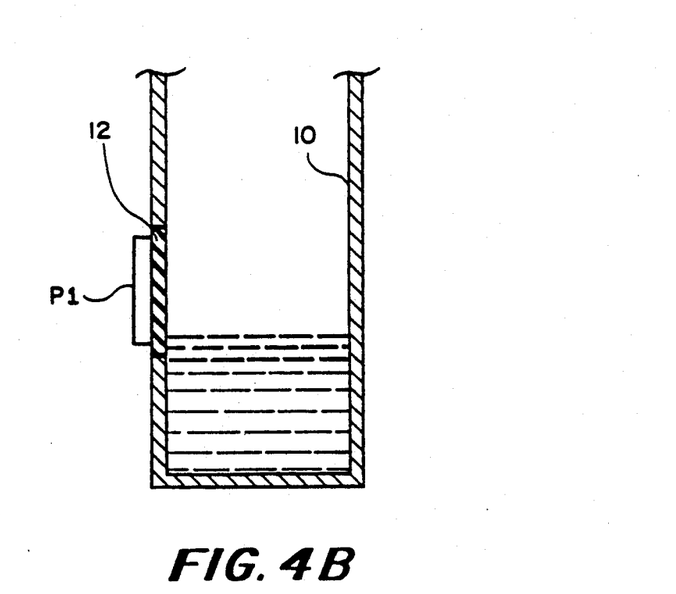

In accordance with the present invention, as shown in FIGS. 4A and 4B, the sensing capacitor plate P1 can be mounted to the receptacle 10 in various ways, depending on whether the receptacle 10 is made of a conductive or a non-conductive material. In one embodiment of the invention shown in FIG. 4A, the fluid receptacle 10 is completely made of a non-conductive material, and the sensing capacitor plate Pl is mounted directly to the surface of the receptacle 10. In another embodiment of the invention shown in FIG. 4B, the receptacle 10 is made of a conductive material except for a relatively small window 12 of non-conductive material making up a portion of a wall of the receptacle 10 upon which the capacitive plate Pl is mounted.

Figure 5:
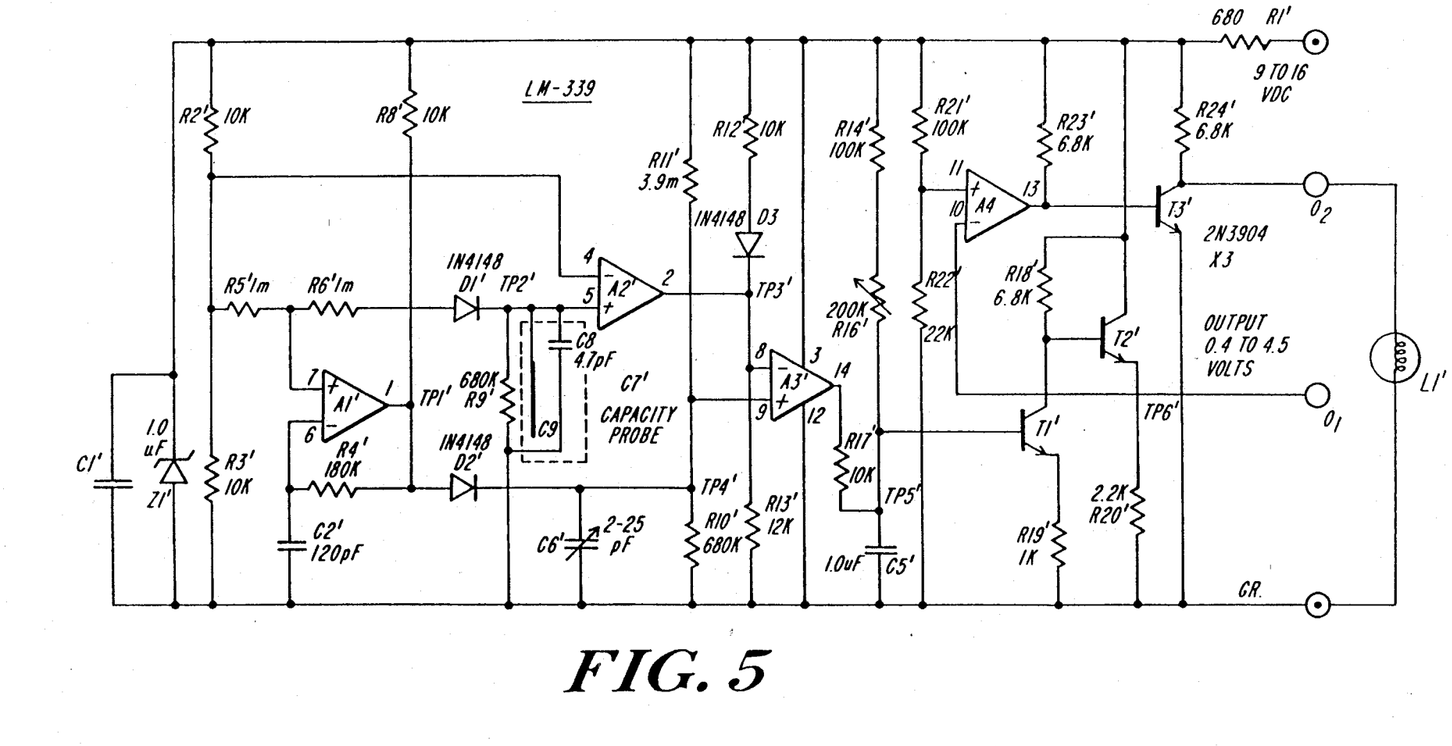
FIG. 5 is a schematic of the circuitry of another embodiment of the invention.

Referring to FIG. 5, as discussed in the previous embodiment, the supply voltage for the circuit is reduced to a 5-volt DC source voltage by means of a voltage regulator comprising the combination of resistor R1' and zener diode Z1. Capacitor C1' serves as a filter for this voltage supply regulator. Amplifier A1' in conjunction with a resistor/capacitor network R4' and C2' and resistors R5' and R6', form a square wave oscillator. A reference voltage is supplied from the voltage regulator where the reference voltage value is determined by the voltage divider circuit R2'/R3'. This voltage serves as a reference voltage for the square wave oscillator and voltage comparator A2' located in the circuit, as will be described.

Figure 6A:
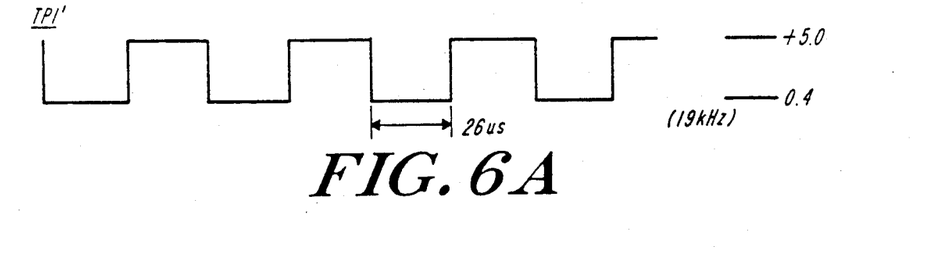
FIGS. 6A–6E are signal diagrams of signals at certain test points in the schematic diagram of FIG. 5.

The output of the square-wave oscillator described above is shown as the square wave of FIG. 6A. The oscillator produces an alternating electrical output which causes capacitors C6' and C7' to charge through diodes D1' and D2', respectively, where capacitor C7' is a sensor capacitor constructed of a capacitor C8' and a capacitor including the capacitive probe C9' connected in parallel and capacitor C6' is a reference capacitor. Capacitor C7' is similar in function to capacitor C4 of the previous embodiments and is the sensor capacitor wherein the two conductive surfaces of the capacitor are probe C9' and the residual ground of the receptacle through its mounting arrangement. The dielectric of the capacitor is the fluid in the receptacle such that the capacitance value of the capacitor comprised of C9' and the conductive grounded portion of the receptacle, and hence the combined capacitive value C7' varies relative to the fluid level in the receptacle. In the illustrative embodiment, the capacitive probe C9' for use in oil level sensing is a wire, such as a 22AWG wire with approximately 7–11pf capacitance. For water sensing, the illustrative 22AWG wire has 0.12 inch outer diameter of insulation and has a capacitance of approximately 5–20pf. The capacitance value of capacitor C6' is adjustable to match the value of capacitor C7' when a predetermined liquid level is sensed.

When the voltage from the oscillator circuit at test point 1' (TP1') makes a transition from positive to negative, capacitors C7' and C6' begin to discharge through resistors R9' and R10', respectively. It is the difference in voltage decay across resistors R9' and R10' due to the capacitance values of capacitors C7' and C6' which enables the circuit to determine the level of fluid in the receptacle.

Figure 6B:
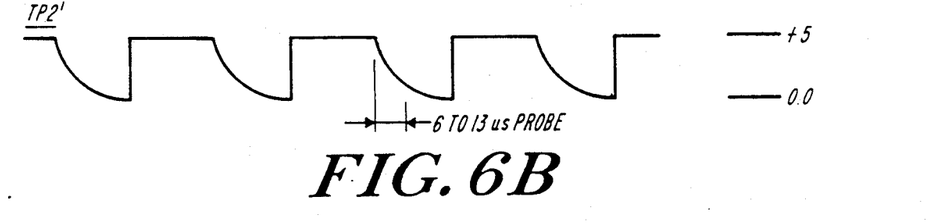
Figure 6C:
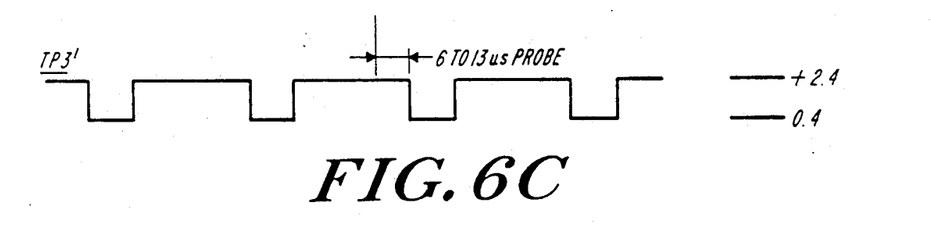

The voltage comparator A2' compares the voltage at test point 2' (TP2') with the reference voltage set by resistors R2' and R3'. FIGS. 6B and 6C illustrate that when the voltage at TP2' decreases below the reference voltage determined by the voltage divider R2' and R3', due to the discharge of capacitor C7', the output of the comparator A2' reference voltage at TP3' drops to zero. The time between the point where capacitor C7' begins to discharge and the output of the comparator A2' drops to zero is used as a reference time T. Similarly, the comparator A3' compares the square wave output of the comparator A2' with the voltage decay signal across resistor R10' due to reference capacitor C6' at test point TP4'.

Figure 6D:
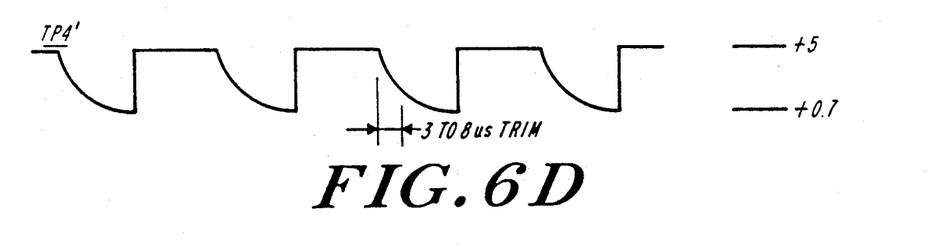
Figure 6E:
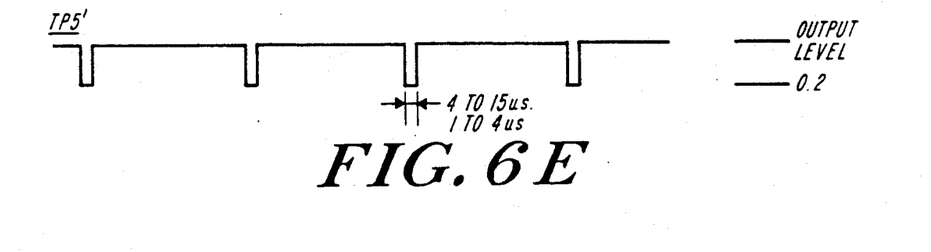

As shown in FIGS. 6C-6E, if the discharge time of reference capacitor C6' is longer than the reference time T established by the comparator A2', the output of the comparator A3' remains high. Conversely, if discharge time of reference capacitor C6' is shorter than reference time T, due to a faster discharge rate in C6', the output of the comparator A3' pulses low for a period of time in which the discharge voltage at TP4' is less than the output voltage of the comparator A2' (TP3'). In application, this pulse is actually a current pulse rather than a voltage pulse. A diode D3' is connected to test point 3' (TP3') to increase the temperature stability of the device.

The output of the comparator A3' is an open collector type output which allows capacitor C5' to charge through resistors R14' and R16'. If the output of A3' pulses low, capacitor C5' discharges to ground and the voltage at test point 5' (TP5') goes to zero.

The combination of resistors R14', R16', and R17' and capacitor C5' act as an integrator whose output is the input to the base of a transistor TR1' which is a first transistor in an emitter-follower pair including TR1', TR2' and resistors R18', R19', and R20'. The integrated voltage at testpoint 5' (TP5') determines the amount of current flowing through transistor TR2' to ground. The resulting voltage drop across resistor R20' determines the voltage between test point 6' (TP6') corresponding with output 01, and ground. In the embodiment shown, this output is substantially linearly dependent upon the pulse width of the negative going signal present at testpoint 1' (TP1') and hence is substantially proportional to the relative decay times of capacitors C6' and C7'. In turn, since the relative capacitances between C6' and C7' is proportional to the amount of dielectric (fluid) adjacent probe C9' the output voltage at 01 is substantially linearly proportional to the amount of fluid in the reservoir.

The output voltage at testpoint 6' (TP6') is also an input to a comparator A4'. The other input of comparator A4' is determined by a voltage divider made of resistors R21' and R22'. The combination of these resistors provide a reference voltage to the comparator A4' such that when the voltage at testpoint 6' (TP6') is less than the reference voltage produced by the divider R21' and R22', the output of the comparator A4' is zero. The output of the comparator A4' is the base voltage of a transistor TR3' and hence determines whether current flows through transistor TR3' by way of resistor output 02 and can be used to control the switching on and off of an indicator light or such in response to the fluid level determined by C7' being below a predetermined amount. By choosing various values of resistors R21' and R22' or alternatively by using a variable resistor for R21' or R22', the setpoint at which the transistor conducts and hence provides an output voltage at output 02, can be varied.

Although the illustrative embodiment has been described herein as incorporating transistors, one of skill in the art can appreciate that other switching means, such as FETs or mechanical switching means can be similarly substituted therefor.

While in one embodiment a probe is indicated herein as being a wire of a certain gauge, it can be appreciated that other wire sizes or probe means can be used in the present invention.

Although the invention has been shown and described with respect to exemplary embodiments thereof, various other changes, omissions and additions in form and detail thereof may be made therein without departing from the the spirit and scope of the invention.

What is claimed is:

1. A fluid level detector for detecting the level of a liquid contained within a receptacle having an electrically conductive portion, comprising:

a probe mounted in said receptacle and electrically insulated from said receptacle, said probe acting as a first plate of a capacitor and being cooperative with said electrically conductive portion of said receptacle acting as a second plate of said capacitor, the liquid in the receptacle acting as a dielectric between said first plate and said second plate of said capacitor to produce a sensor capacitor having a capacitance which varies in magnitude in accordance with the level of liquid contained within the receptacle;

detecting circuitry coupled to said probe and responsive to a difference between a voltage decay signal derived from said sensor capacitor and a reference voltage decay signal derived from a reference capacitor to provide an output signal when a predetermined voltage difference is detected therebetween; and indicating means coupled to said detection circuitry and responsive to said predetermined voltage difference as detected by said detection circuitry to provide an indication of the level of liquid contained within the receptacle.

2. The fluid level detector of claim 1, wherein said indicating means includes an output whereat an output voltage is produced which is substantially linearly proportional to the amount of fluid in said receptacle.

3. The fluid level detector of claim 1, wherein said indicating means includes an output functioning as an ON/OFF switch that is ON when the level of fluid in said receptacle exceeds a redetermined level.

4. The fluid level detector of claim 3, wherein said predetermined level is selectable.

5. The fluid level detector of claim 1, wherein said indicating means includes a first output whereat an output voltage is produced, which is substantially linearly proportional to the amount of fluid in said receptacle, an a second output functioning as an ON/OFF switch that is ON when the level of fluid is said receptacle exceeds a predetermined level.

* * * * *

UNITED STATES PATENT AND TRADEMARK OFFICE
CERTIFICATE OF CORRECTION

PATENT NO. : 5,182,545
DATED : January 26, 1993
INVENTOR(S) : Lewis E. Goekler, et al.

It is certified that error appears in the above-indentified patent and that said Letters Patent is hereby corrected as shown below:

Column 3, line 55, "plate Pl" should read --plate P1--.

Column 3, line 57, "plate Pl" should read --plate P1--.

Column 3, line 68, "plate Pl" should read --plate P1--.

Column 4, line 6, "plate Pl" should read --plate P1--.

Column 5, lines 48-49, "resistor output 02" should read --resistor R24. In this manner, transistor TR3' acts as an on-off switch for output 02--.

Column 6, line 29, "detecting" should read --detection--.

Column 6, line 48, "redetermined" should read --predetermined--.

UNITED STATES PATENT AND TRADEMARK OFFICE
CERTIFICATE OF CORRECTION

PATENT NO. : 5,182,545
DATED : January 26, 1993
INVENTOR(S) : Lewis E. Goekler, et al.

It is certified that error appears in the above-indentified patent and that said Letters Patent is hereby corrected as shown below:

Column 6, line 55, "an a second" should read --and a second--.

Signed and Sealed this

Seventeenth Day of May, 1994

*Attest:*

BRUCE LEHMAN

*Attesting Officer*   *Commissioner of Patents and Trademarks*